United States Patent
Poulbere et al.

(10) Patent No.: US 6,785,350 B1
(45) Date of Patent: Aug. 31, 2004

(54) APPARATUS, AND ASSOCIATED METHOD, FOR DETECTING A SYMBOL SEQUENCE

(75) Inventors: Vincent Poulbere, Toulouse (FR); Mika Kasslin, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/418,293

(22) Filed: Oct. 14, 1999

(51) Int. Cl.[7] .......................... H04B 1/26; H03D 1/00
(52) U.S. Cl. ................... 375/343; 375/340; 375/364
(58) Field of Search ........................ 375/148, 150, 375/301, 340, 355, 359, 364; 370/338; 709/250

(56) References Cited

U.S. PATENT DOCUMENTS

| | | | |
|---|---|---|---|
| 5,012,491 A | * 4/1991 | Iwasaki | 375/343 |
| 5,715,284 A | 2/1998 | Shoji et al. | 375/365 |
| 6,016,329 A | * 1/2000 | Iwasaki | 375/340 |
| 6,088,411 A | * 7/2000 | Powierski et al. | 375/364 |

FOREIGN PATENT DOCUMENTS

| EP | 0 431 957 A2 | 6/1991 | H04L/7/04 |
|---|---|---|---|
| WO | WO 98/27684 | 6/1998 | H04L/7/08 |

OTHER PUBLICATIONS

Mizoguchi et al., A Fast Burst Synchronization Scheme for OFDM, 1998, ICUPC '98 IEEE 1998International Conference on, vol.: 1, 1998 pp. 125–129.*

Tufvesson et al., Time and Frequency Synchronization of OFDM using PN–Sequence Preambles, Vehicular Technology Conference, 1999 VCT–1999–Fall IEEE VTC 50th, volumn 4, 1999 pp. 2203–2207.*

* cited by examiner

Primary Examiner—Stephen Chin
Assistant Examiner—Edith Yeh

(57) ABSTRACT

Apparatus, and an associated method, by which to detect a symbol sequence, such as the preamble portion of a frame. Phase calculations are performed, and values of the phase calculations are at least in part determinative of detection of receipt of the symbol sequence. In one implementation, a manner is provided by which to detect reception of the preamble portion of a frame of data broadcast upon a broadcast control channel defined in a HIPERLAN/2 system.

15 Claims, 4 Drawing Sheets

APPARATUS, AND ASSOCIATED METHOD, FOR DETECTING A SYMBOL SEQUENCE

The present invention relates generally to a manner by which to detect a symbol sequence, such as a preamble portion of a data frame, generated during operation of the communication system. More particularly, the present invention relates to apparatus, and an associated method, by which phase calculations are performed to, at least in part, detect receipt at a receiving station of the symbol sequence. Greater detection reliability is provided through operation of an embodiment of the present invention as false, i.e., erroneous, symbol sequence detections are less likely to be made when phase calculations are used to detect the symbol sequence.

BACKGROUND OF THE INVENTION

Advancements in communication technologies have permitted the introduction, and popularization, of new types of communication systems. In various of such new types of communication systems, the rate of data transmission and the corresponding amount of data to be permitted to be communicated, has increased relative to existing types of communication systems.

New types of radio communication systems are exemplary of communication systems made possible as a result of advancements in communication technologies. Communication channels of a radio communication system are formed upon radio-links, thereby obviating the need for conventional wireline connections between sending and receiving stations operable therein. A radio communication system, therefore, inherently permits increased communication mobility in contrast to conventional wireline systems.

Bandwidth limitations sometimes limit the communication capacity of the communication system. That is to say, the bandwidth capacity of the communication channel, or channels, available to a communication system to communicate information between sending and receiving stations is sometimes limited. And, the limited capacity of the communication channel, or channels, limits increase of the communication capacity of the communication system. The communication capacity of a radio communication system is particularly susceptible to capacity limitations resulting from communication channel bandwidth limitations. Generally, a radio communication system is allocated a limited portion of the electromagnetic spectrum upon which to define communication channels. Communication capacity increase of a radio communication system is, therefore, sometimes limited by such allocation. Increase of the communication capacity of the radio communication system, therefore, is sometimes only possible if the efficiency by which the allocated spectrum is used is increased.

Digital communication techniques provide a manner by which the bandwidth efficiency of communications in the communication system may be increased. Because of the particular need in a radio communication system to efficiently utilize the spectrum allocated in such a system, the use of digital communication techniques is particularly advantageously implemented therein.

When digital communication techniques are used, information which is to be communicated is digitized. In one technique, the digitized information is formatted into packets, or frames, and the packets are communicated to effectuate the communication. Individual ones, or groups, of the packets of data can be communicated at discrete intervals, and, once communicated, concatenated together to recreate the informational content contained therein.

Because packets of data can be communicated at the discrete intervals, a communication channel need not be dedicated solely for the communication of packet data generated by one sending station to one receiving station as conventionally required in circuit-switched communications. Instead, a single channel can be shared amongst a plurality of different sending and receiving station-pairs. Because a single channel can be utilized to effectuate communications by the plurality of pairs of communication stations, improved communication capacity is possible.

Packet data communications are effectuated, for instance, in conventional LANs (local area networks). Wireless networks, operable in manners analogous to wired LANs, have also been developed and are utilized to communicate packets of data over a radio-link thereby to effectuate communications between a sending and receiving station.

For example, A High Performance Radio Local Area Network, type 2 (HIPERLAN/2) standard promulgated by the ETSI sets forth a standard for operation of a wireless LAN operable in the five GHz range. In this standard, a medium access control (MAC) frame structure is defined. The MAC frame structure consists of several kinds of transport channels that are used to deliver both control information and user data. In the system defined by the HIPERLAN/2 standard, as well as other wireless LANs, mobile stations are utilized by users of the network to effectuate telephonic communications. The telephonic communications include, for example, voice as well as data communications.

Data which is to be communicated is formatted into frames of data in which a frame is formed of a preamble portion and a payload portion. Frame-formatted data is transmitted, for instance, on the down-link transport channel. A mobile station tuned to a frequency channel must be able to detect the preamble portion of the frame so that the informational content of the frame, i.e., the payload portion, can be properly utilized.

In at least one existing manner proposed by which to detect the preamble portion, correlation calculations are performed by the mobile station. A ratio is formed of the calculated correlation value relative to average power levels. And, the ratio, so-formed, is compared with a threshold value. If the value of the ratio is greater than the threshold, a determination is made that the preamble portion of the frame is received, and following portions of the frame form the payload.

However, performing such calculations on other portions of the frame might also indicate that such other portions of the frame form the preamble portion. Therefore, the reliability of this existing manner by which to detect the preamble portion is deficient.

A manner by which more reliably to detect reception of a preamble portion of a frame of data would therefore be advantageous.

It is in light of this background information related to the communication of data that the significant improvements of the present invention have evolved.

SUMMARY OF THE INVENTION

The present invention, accordingly, advantageously provides apparatus, and an associated method, by which to detect, at a receiving station, reception of a selected symbol sequence, such as a preamble portion of a frame of data. Phase calculations are performed to detect, at least in part, the selected symbol sequence.

Operation of an embodiment of the present invention provides a manner by which to detect the selected symbol sequence with greater reliability than generally possible through the use of conventional detection techniques. Particularly when phase calculations, performed pursuant to the operation of an embodiment of the present invention, are used together with correlation and power level calculations, false, i.e., erroneous symbol sequence detections are less likely to be made, thereby resulting in improved performance of the receiving station at which an embodiment of the present invention is operable.

Also, ratio calculation of calculated correlation values relative to calculated power level values is a computationally-intensive procedure. Through operation of an embodiment of the present invention, such ratio calculation is performed only if the phase calculation indicates detection of the selected symbol sequence.

In one aspect of the present invention, a receiving station is tunable to receive frame-formatted data transmitted thereto upon a communication channel. Each frame of the frame-formatted data is formed of a preamble portion and a payload portion. The selected symbol sequence detected during operation of an embodiment of the present invention is the preamble portion of a frame of data. Phase calculations are performed upon successive sequential portions of the symbols received thereat. If the calculated phase values exceed a phase-value threshold level, at least a preliminary determination is made that the corresponding symbol sequence forms the preamble portion of a frame. In the exemplary implementation, subsequent to detection of the calculated phase value to be in excess of the phase-value threshold, a further comparison is made prior to final determination that the corresponding symbol sequence forms the preamble portion of a frame of data. In this implementation, a peak test is further performed. That is, a determination is made as to whether a ratio formed of correlation values of the sequence relative to average power levels of the sequence are beyond a peak-value threshold. If so, a final determination is made that the corresponding symbol sequence is the preamble portion of the frame of data. Thereafter, processing can be performed upon the payload portion of the frame. Also, in one implementation, timing synchronization is performed to synchronize the receiving station with the signal received thereat.

In another aspect of the present invention, a mobile station is provided for a wireless LAN (local area network) such as that defined in the ETSI-promulgated HIPERLAN/2 standard for a five GHz, wireless LAN. In the system defined therein, a TDD (time division duplex) communication scheme is utilized. Frames of data are broadcast by network infrastructure, such as by an access point which forms a portion of the network infrastructure. Frames of data are broadcast, for instance, upon a system specific transport channel for control information, BCH. And, mobile stations are tunable to a frequency channel to receive the frames of data broadcast thereon. Each frame is formed of a preamble portion and a payload portion. And, in order to determine properly the content of the payload portion of the frames of data, the mobile station must first detect the preamble portion of a frame. An embodiment of the present invention is operable at a mobile station operable in such a HIPERLAN/2 system. Computations are made upon successive portions of data, broadcast upon the BCH and received at the mobile station. The computations include calculation of correlation values of successive, sequential portions of the receive signal and also calculations of corresponding average power levels. The calculated correlation values are utilized to calculate phase values of the corresponding segments. A determination is made whether the calculated phase values exceed a phase-value threshold level or at least a selected period. If not, a determination is made that the corresponding sequence is not the preamble portion of a frame of data. If, however, the calculated phase values exceed the phase-value threshold, an additional peak test is performed. The peak test determines whether a ratio formed of the calculated correlation values relative to the calculated average power levels exceed a peak-test threshold. If so, a determination is made that the corresponding sequential portion of the receive signal forms the preamble portion of a frame of data. Such a determination permits additional operations to be performed upon the data payload of the frame and also to permit time synchronization between the mobile station and the network infrastructure from which the forms of data are broadcast upon the BCH.

In the aforementioned HIPERLAN/2 system, the preamble portions of the frames of data broadcast upon the BCH by the network infrastructure are of values which exhibit two correlation peaks and a phase value of $\pi$ radians around the first correlation peak. Calculations performed at the mobile station detect both the phase peak and the correlation peak so that reception of the preamble portion of a frame of data is detectable at the mobile station. In other implementations, other peak and phase locations are otherwise determinable to detect the preamble portion of a corresponding frame of data.

In these and other aspects, therefore, apparatus, and an associated method, is provided for a communication device operable at least to receive a data sequence generated during operation of a communication system. The data sequence includes a selected symbol set which identifies a start of the data sequence. Detection is made during operation of an embodiment of the present invention of the selected symbol set. A phase detector is coupled to receive indications of the data sequence once received at the communication device. The phase detector detects phase values associated with successive portions of the data sequence. And, a selected symbol set detector is coupled to receive indications of the phase values detected by the phase detector. The selected symbol set detector is operable, at least in part, responsive to the indications of the phase values to detect reception of the selected symbol set.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
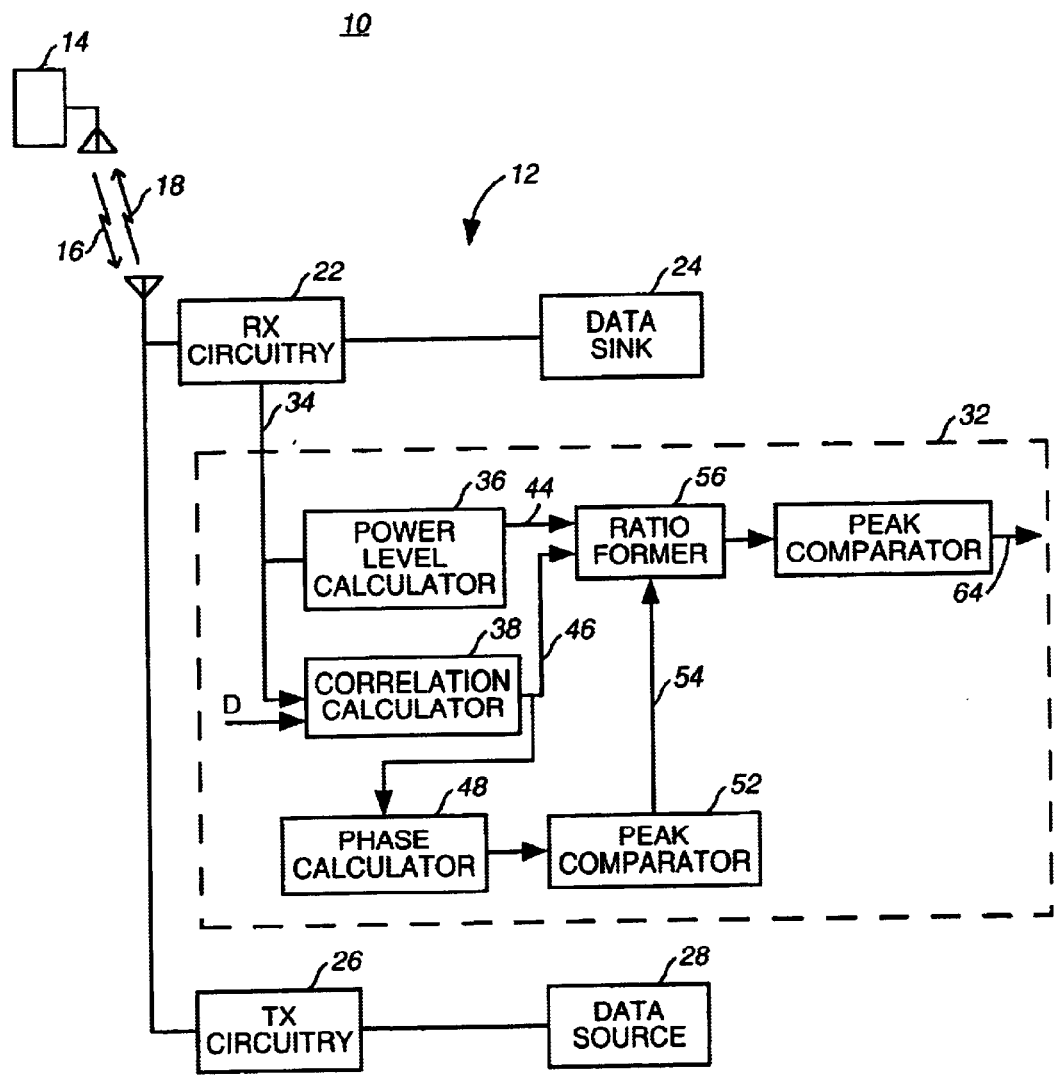
FIG. 1 illustrates a functional block diagram of a communication system in which an embodiment of the present invention is operable.

Referring first to FIG. 1, a communication system, shown generally at provides for the communication of frame-formatted data between a mobile station 12 and network infrastructure which includes an access point (AP) 14. The communication system 10 forms a multi-user communication system in which the mobile station 12 is one of a plurality of mobile stations capable of communicating frame-formatted data with the network infrastructure. In the exemplary implementation, the communication system 10 forms a radio communication system in which communication channels are defined upon radio-links formed between the network infrastructure and the mobile station. And, more particularly, the communication system 10 is representative of the aforementioned HIPERLAN/2 system. While the following description shall describe operation of an embodiment of the present invention with respect to a HIPERLAN/2 system, it should be understood at the outset that an embodiment of the present invention could analogously be implemented in other types of communication systems to detect symbol sequences received at a receiving station and that operation of other embodiments of the present invention can similarly be described analogous to the description herein.

In a HIPERLAN/2 system, a BCH (broadcast control channel) is defined upon which broadcast information is broadcast by the network infrastructure to mobile stations. Here, the arrow 16 is representative of the broadcast channel upon which frame-formatted data is broadcast to mobile stations, including the mobile station 12. As the HIPERLAN/2 system is a two-way system, the arrow 18 is representative of an uplink upon which communication channels are defined for the communication of mobile station-generated data to the network infrastructure.

The mobile station includes receive circuitry 22 tunable to receive data transmitted thereto over a radio-link, such as upon the BCH 16. The receiver circuitry 22 is coupled to a data sink, such as an acoustic transducer. The data sink 24 forms the destination of certain of the receive signals received by the receiver circuitry, once operated upon by the receive circuitry 22.

The mobile station 12 also includes a transmitter portion, here including transmitter circuitry 26 and a data source 28, such as an acoustic transducer. Data generated, or otherwise provided, by the data source to the transmitter circuitry is acted upon, to be converted into form suitable for transmission upon a radio-link uplink, such as that represented by the arrow 18. Acknowledgments of reception of frames of data broadcast to the mobile station as well as data originated at the mobile station is transmitted thereon.

The mobile station further includes a controller 32 operable to control operation of the mobile station. The controller 32 is here shown to include functional elements which are operable pursuant to an embodiment of the present invention. The elements are functionally represented and, in the exemplary implementation, are implemented by algorithms executed by processing circuitry. In other implementations, the functions performed by the functional elements are implemented in other manners.

In operation, the illustrated embodiment of the present invention is operable to detect a selected symbol sequence received at the receiver circuitry 22. And, in the exemplary implementation in which the mobile station 12 is operable in a HIPERLAN/2, the selected symbol sequence forms the preamble portion of a frame of data, such as a preamble portion of a frame of data broadcast upon the BCH 16.

The controller 32 is coupled, here represented by the line 34, to receive indications of symbol sequences, i.e., the receive signal, received by the receive circuitry 22. Such sequences are provided to a power level calculator 36 and to a correlation calculator 38. The power level calculator 36 is operable to compute a signal power, R(k) over L signal samples according to the following equation:

$$R(k) = \sum_{n=0}^{L-1} |r(k+n+L)|^2$$

Wherein:
L is a length, in terms of signal samples of an averaging window;
k is a kth signal sample; and
n is an nth signal sample.

The correlation calculator is operable to calculate correlations of a signal sample with a delayed version of itself according to the following equation:

$$P(k)=\Sigma r(k=n).r(k+n+D)$$

Wherein:
L is a length, in terms of signal samples of an averaging window;
k is the kth signal sample,
n is the nth signal sample; and
D is the amount of delay by which the signal is correlated against itself.

As shown in FIG. 1, the value of D is provided to the correlation calculator 38 [by way of the line 42]. Calculations of the average power level R(k) and the calculated correlation value, P(k), are generated on the lines 44 and 46 respectively.

The line 46 is coupled to a phase calculator 48. The phase calculator is operable to calculate phases associated with the correlation values calculated by the correlation calculator 38. The phases are calculated according to the following equation:

$$\{phase(P(k-N+1))|{>}PH, \ldots ,|phase(P(k-1))|{>}PH, |phase(P(k))|{>}PH,|\}$$

Wherein:
PH is a phase threshold;
k is the kth signal sample; and
N is a range of indexes over which the phase test must be valid.

The comparison of the calculated phase value with the phase threshold PH is performed by the peak comparator 52. If the phase test is valid over the N in the range of indexes, an indication of such determination is generated on the line 54. Line 54 is coupled to a ratio former 56. The lines 44 and 46 are also coupled to the ratio former 56.

The ratio former 56 is operable to form a ratio of the values of the calculated correlation, P(k) relative to average power levels, R(k) when the value on the line 54 indicates that the phase test is valid over the N range of indexes. That is to say, the ratio former calculates the following ratio:

$$\left|\frac{P(k)}{R(k)}\right| > TH$$

Wherein:
Ratios calculated by the ratio former 56 are provided to a peak threshold comparator. The peak threshold comparator 63 compares the calculated values of the ratio former with a selected threshold level. If the ratio formed by the ratio former 56 exceeds the threshold level, positive indication is indicated on the line 64 to indicate detection of the selected symbol sequence.

Through operation of the elements of the controller 32, phase calculations are performed by the phase calculator 48, and an indication is generated on the line 54 by the peak comparator 52 when calculated phase values exceed a phase threshold over a selected range. Only if there is a positive indication generated on the line 54 are ratios formed by the ratio former 56.

Because formation of the ratios is a computationally intensive procedure, prior calculation of the phase values and detection of the phase values in excess of the phase threshold prior to permitting formation of the ratios by the ratio former reducing otherwise unnecessary computations by the ratio former. Thereby, a manner is provided by which to detect a symbol sequence, such as a preamble portion of a frame, based upon two separate criteria, calculated phase values and calculated ratio levels.

Figure 2:
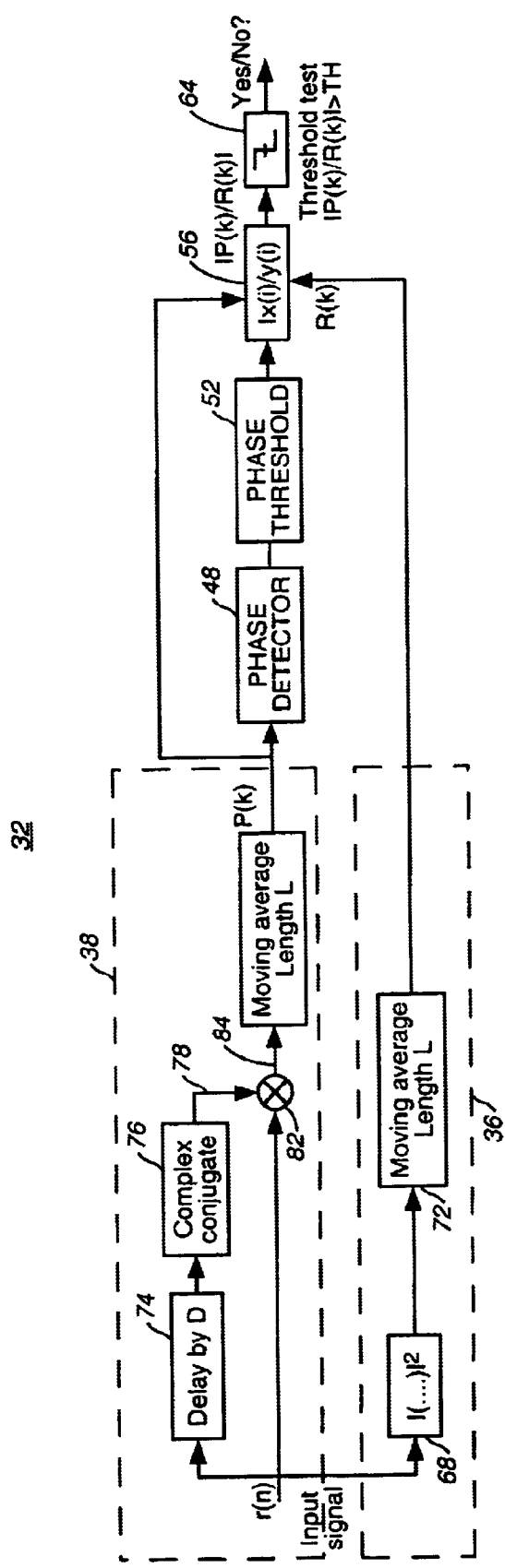
FIG. 2 illustrates a functional block diagram of the apparatus of an embodiment of the present invention and which forms a portion of the mobile station of the communication system shown in FIG. 1.

FIG. 2 again illustrates portions of the controller 32 shown in FIG. 1 to form portions of a mobile station and operable pursuant to an embodiment of the present invention. Here again, the power level calculator 36 and correlation calculator 38 for generating values of R(k) and P(k) on the lines 44 and 46 are shown to form portions of the controller. And, the phase calculator 48 and comparator 52, together operable to generate an indication on the line 54 when calculated phase values exceed a phased threshold are again shown to form portions of the controller 32. Also, the ration former 56 operable to form the ratios of P(k)/R(k) and peak comparator 63 are again illustrated in the figure.

The power level calculator 36 is here shown to include a magnitude calculator 68 and a moving average length, L, determiner 72. Operation of the elements 68 and 72 together form the average power level over length L.

The correlation calculator 38 is here further to include a delay element 74 operable to the delay and input signal by a delay D, a complex conjugate calculator 76 for generating a conjugate value on the line 78 which is coupled to an input of a mixer element 82. The input signal is also directly applied to another input to the mixer 82. The mixer generates a mixed signal on the line 84 which is applied to a moving average length, L, which averages the mixed signal over the length, L.

Figure 3:
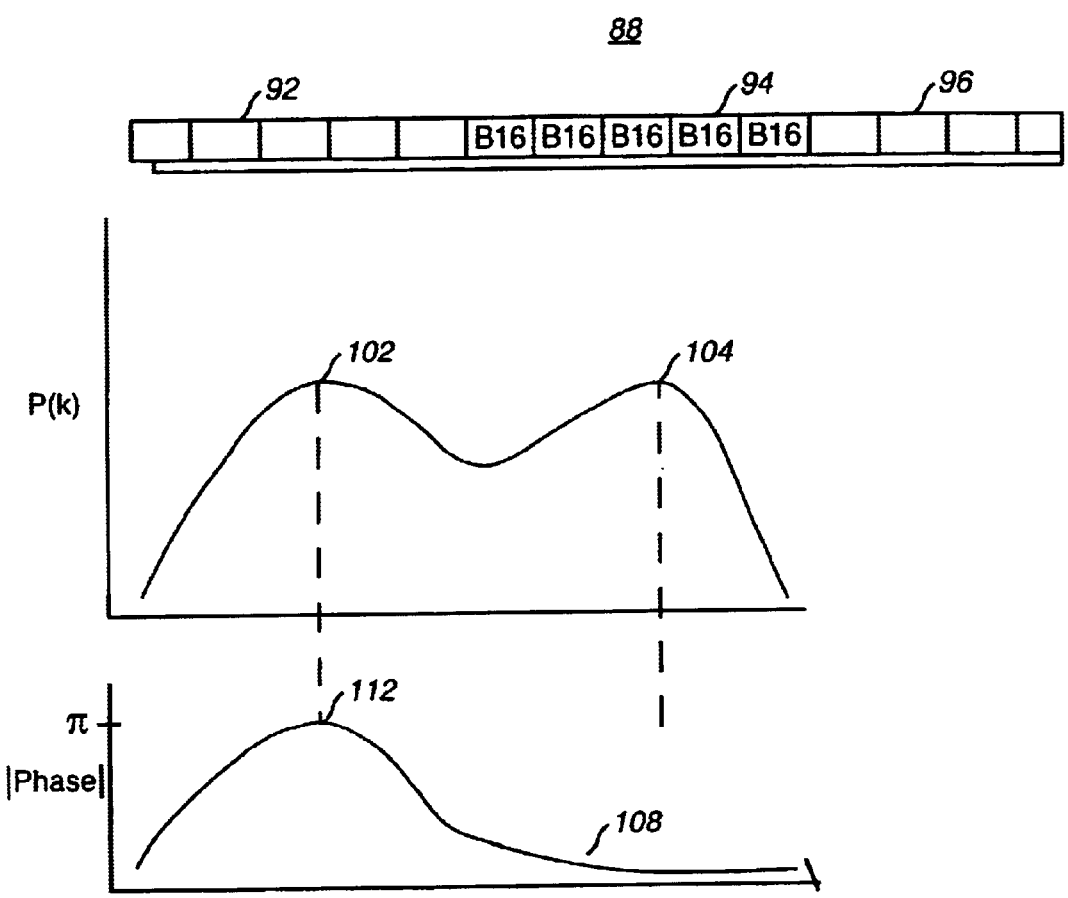
FIG. 3 illustrates the frame structure of a frame, the preamble portion of which is detectable during operation of an embodiment of the present invention.

FIG. 3 illustrates the frame structure, shown generally at 88, of the preamble portion of a frame of data, defined pursuant to the HIPERLAN/2 system, to be broadcast upon the broadcast control channel (BCH). The preamble portion includes an A sequence 92, a B sequence 94, and a C sequence 96. The A sequence 92 is used for frame detection. Each symbol, designated by A16, of the A sequence is a quarter OFDM (orthogonal frequency division multiplexed) symbol of a length sixteen in the time domain. As described more fully in the HIPERLAN/2 standard, the modulation proposed therein is OFDM and sixty-four sub-carriers are defined in the system. The Figure further includes a graphical representation 98 showing the correlation calculations formed during operation of an embodiment of the present invention with respect to the preamble portion 88. The correlation exhibits two correlation peaks, peak 102 and peak 104. The peak 102 corresponds to the A sequence 92 and the second peak 104 corresponds to the B sequence 94.

The Figure further includes a graphical representation 108 of the calculated phase corresponding to the preamble portion 88 which is calculated during operation of an embodiment of the present invention. The graphical representation indicates that the phase exhibits a magnitude of approximately π radians over a range of indexes k around the first peak 102, indicated at 112 in the Figure.

During operation of an embodiment of the present invention, the peak value 112 is ascertained, and the ratio test, above-described, is performed to detect the reception of the preamble portion 88.

Figure 4:
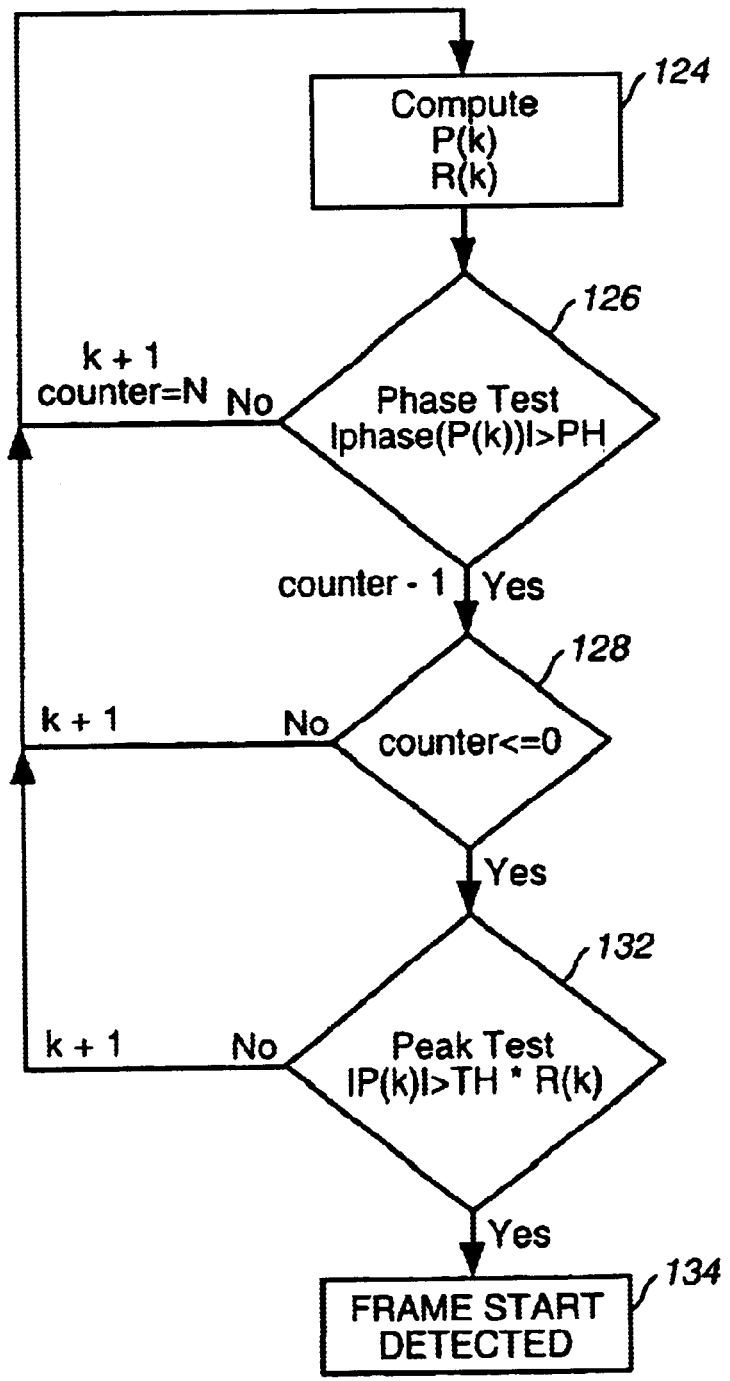
FIG. 4 illustrates a method flow diagram listing the method of operation of an embodiment of the present invention.

FIG. 4 illustrates a method flow diagram shown generally at 122 illustrating the method of operation of an embodiment of the present invention. The method 122 is operable to detect the preamble portion of a frame of data, thereby to detect a frame-start.

First, and as indicated by the block 124, values of P(k) and R(k) are calculated. Then, and as indicated by the decision block 126, a determination is made as to whether the phase values associated with the calculated values of correlation exceed a phased threshold. If not, the NO HIPERLAN/2ch is taken, the counter is incremented, and a loop is taken back to the block 124. If, however, the phase test indicates that the calculated phase value exceeds the phased threshold, the YES HIPERLAN/2ch is taken to the decision block 128. When the YES HIPERLAN/2ch is taken, a counter value is decremented, and, a determination is made at the decision block as to whether the counter value is less than or equal to zero. If not, the NO HIPERLAN/2ch is taken, a count value is incremented and a loop is taken back to the block 124. If, conversely, the count value is less than or equal to zero, the YES HIPERLAN/2ch is taken to the decision block 132.

At the decision block 132, a determination is made as to whether the ratio of P(k)/R(k) is greater than a peak threshold value. If not, the NO HIPERLAN/2ch is taken, a count value is incremented and a loop is taken back to the block 124. Otherwise, if the peak test is satisfied, the YES HIPERLAN/2ch is taken and a determination is made, as indicated by the block 134, that the preamble portion is detected, and a frame-start is detected.

In other embodiments, other types of preamble structures, or other symbol sequences, are analogously detected. Also, timing synchronization is possible through operation of an embodiment of the present invention because timing synchronization first includes the detection of a peak in the correlation P(k). With respect to the preamble portion 88, two correlation peaks are found, with delay D equals 16 and window size L equals 48. The first correlation peak is due to the A sequence 92, and the second correlation peak is due to the B sequence 94. Yet the phase of P(k) around the second peak position remains about zero. Accordingly, it is possible to use the above-described method to detect the second peak, and then possibly to perform timing synchronization except that the phase should remain under a phase threshold, rather that in excess of the phased threshold.

Thereby, operation of an embodiment of the present invention provides a manner by which to detect receipt at a receiving station of a symbol sequence, such as a preamble portion of a frame. Greater detection reliability is provided as phase calculations are performed to, at least in part, detect the symbol sequence.

The previous descriptions are of preferred examples for implementing the invention, and the scope of the invention should not necessarily be limited by this description. The scope of the present invention is defined by the following claims.

We claim:

1. In a communication device operable at least to receive a data sequence generated during operation of a communication system, the data sequence includes a selected symbol set which identifies a start of the data sequence, an improvement of apparatus for detecting the selected symbol set, said apparatus comprising:

a correlator coupled to receive indications of the data sequence, said correlator for performing the correlation calculations upon the data sequence to produce correlation values associated with the data sequence;

a phase detector coupled to receive indications of the correlation values from the correlater, said indications of the correlation values representative of the data sequence, said phase detector for detecting phase values associated with successive portions of the data sequence;

a selected symbol set detector coupled to receive indications of the phase values detected by said phase detector, said selected symbol set detector operable, at least in part, responsive to the indications of the phase values to detect reception of the selected symbol set; and an average power level calculator also coupled to receive indications of the data sequence, said average power level calculator for calculating average power levels of the data sequence, said selected symbol set detector further coupled to receive indications of the average power levels calculated by said average power level calculator, and said selected symbol set detector further operable responsive to the indications of the average power levels.

2. The apparatus of claim 1 wherein the data sequence comprises at least one frame of data, the frame of data including a preamble portion and a payload portion, the preamble portion forming the selected symbol set, and wherein said phase detector detects phase values associated with successive portions of the frame of data.

3. The apparatus of claim 2 wherein the preamble portion is formed of symbols which exhibit selected phase values and wherein said selected symbol set detector comprises a preamble detector operable to detect when the indications of the phase values indicate reception of the symbols of the preamble portion.

4. The apparatus of claim 1 wherein said selected symbol set detector is further coupled to receive indications of the correlation calculations performed by said correlator, said selected symbol set detector further operable responsive to the indications of the correlation calculations.

5. The apparatus of claimed 1 wherein said selected symbol set detector is further coupled to receive indications of the correlation calculations performed by said correlator, said selected symbol set detector further operable responsive to ratios of values of the correlation calculations relative to values of the average power levels.

6. The apparatus of claim 5 wherein said selected symbol set detector detects the selected symbol set to have been received at the communication device when the indications of the phase values are greater than a selected phase-value threshold.

7. The apparatus of claim 6 wherein said selected symbol set detector detects the selected symbol set to have been received at the communication device when both the indications of the phase values are greater than the selected phase-value threshold and the ratios of the values of the correlation calculations relative to values of the average power levels are greater than a selected ratio-value threshold.

8. The apparatus of claim 6 wherein said selected symbol set detector detects the selected symbol set to have been received at the communication device when the indications of the phase values are greater than the selected phase-value threshold for at least a selected period.

9. The apparatus of claim 1 wherein the communication device comprises a mobile station, wherein the communication system comprises a WLAN (wireless local area network), wherein the selected symbol set comprises a preamble portion of a frame broadcast upon a BCH (broadcast control channel) defined in the WLAN, and wherein said phase detector and said selected symbol set detector form portions of the mobile station, operable to detect reception thereat of the preamble portion of the frame.

10. Apparatus for detecting a preamble portion of a frame of data transmitted to a mobile station during operation of a WLAN (wireless local area network), said apparatus comprising:

a correlator coupled to receive indications of the frame of data, said correlator for calculating correlation values of sequential portions of the frame of data;

a phase detector coupled to receive indications of the correlation values calculated by said correlator, said phase detector for detecting phase values associated with the sequential portions of the frame of data; and a preamble portion detector coupled to receive indications of the phase values detected by said phase detector, said preamble portion detector for detecting the preamble portion when the phase values exceed a selected phase-value threshold;

wherein said preamble portion detector is further coupled to receive indications of values representative of the correlation values; said preamble portion detector for detecting the preamble portion when both the phase values exceed a selected phase-value threshold and the indications of values representative of the correlation values exceed a selected correlation-value threshold.

11. The apparatus of claim 10 wherein the values representative of the correlation values comprise values of ratios of the correlation values to average power levels of sequential portions of the frame of data.

12. In a method for communication with a communication device operable at least to receive a data sequence generated during operation of a communications system, the data sequence includes a selected symbol set which identifies a start of the data sequence, an improvement of apparatus for detecting reception of the selected symbol set at the communication device, said method comprising:

determining phase values associated with successive portions of the data sequence;

detecting the reception of the selected symbol set responsive to phase values of selected phase-value levels during the said operating of determining; and determining ratios of correlation values of portions of the data sequence relative to average power levels of the portions of the data sequence and wherein the operation of detecting is further responsive to values of the ratios.

13. The method of claim 12 comprising the additional operation of time synchronizing the communication device with the selected symbol set detected during said operation of detecting.

14. The method of claim 12 wherein the reception of the selected symbol set detected during said operation of detecting is detected when both the phase values are greater than the selected phase-value levels and the ratios are greater than selected ratio-value levels.

15. The method of claim 14 wherein the reception of the selected symbol set detected responsive to determination of the phase values being greater than the selected phase-value levels for at least a selected period.

* * * * *